United States Patent [19]
Leeds et al.

[11] Patent Number: 5,634,548
[45] Date of Patent: Jun. 3, 1997

[54] BRICK DEHACKER

[75] Inventors: Dan Leeds; Raymond Thompson, both of Clarksville, Ark.; Pat Brown, Cary, N.C.

[73] Assignee: Artech, Clarkville, Ark.

[21] Appl. No.: 496,952

[22] Filed: Jun. 30, 1995

[51] Int. Cl.⁶ .................................................. B65G 47/24
[52] U.S. Cl. ........................ 198/403; 198/434; 414/788.5; 414/789.6; 414/931
[58] Field of Search .................................. 198/403, 432, 198/434; 414/788.5, 789.6, 792.6, 931

[56] References Cited

U.S. PATENT DOCUMENTS

| | | | |
|---|---|---|---|
| 3,656,634 | 4/1972 | Pearne et al. | 414/931 |
| 3,667,622 | 6/1972 | Kamphues et al. | 414/931 |
| 3,905,489 | 9/1975 | Berndt et al. | 414/931 |
| 4,036,350 | 7/1977 | Jones | 414/931 |
| 4,068,766 | 1/1978 | Schmitt | 414/931 |
| 4,161,368 | 7/1979 | Batzdorff | 414/931 |
| 5,437,535 | 8/1995 | Leeds et al. | 198/432 |

*Primary Examiner*—Joseph E. Valenza
*Attorney, Agent, or Firm*—Rhodes Coats & Bennett, L.L.P.

[57] ABSTRACT

A brick dehacking apparatus. The dehacking apparatus is operable to blend the upper and lower courses of brick from a kiln car with each other and further blend these brick with brick from the middle courses of the stack in preparation for stacking and strapping.

39 Claims, 12 Drawing Sheets

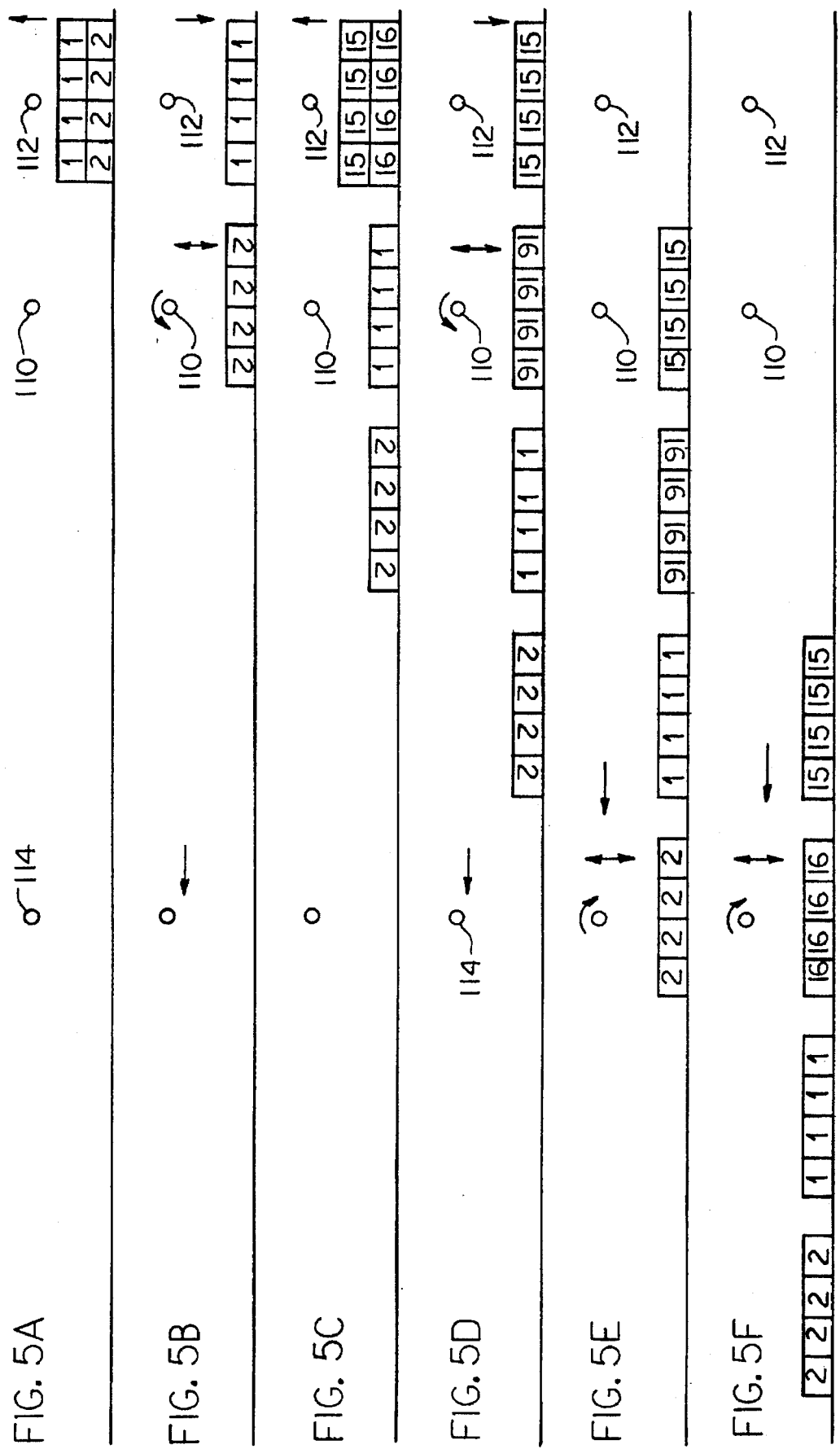

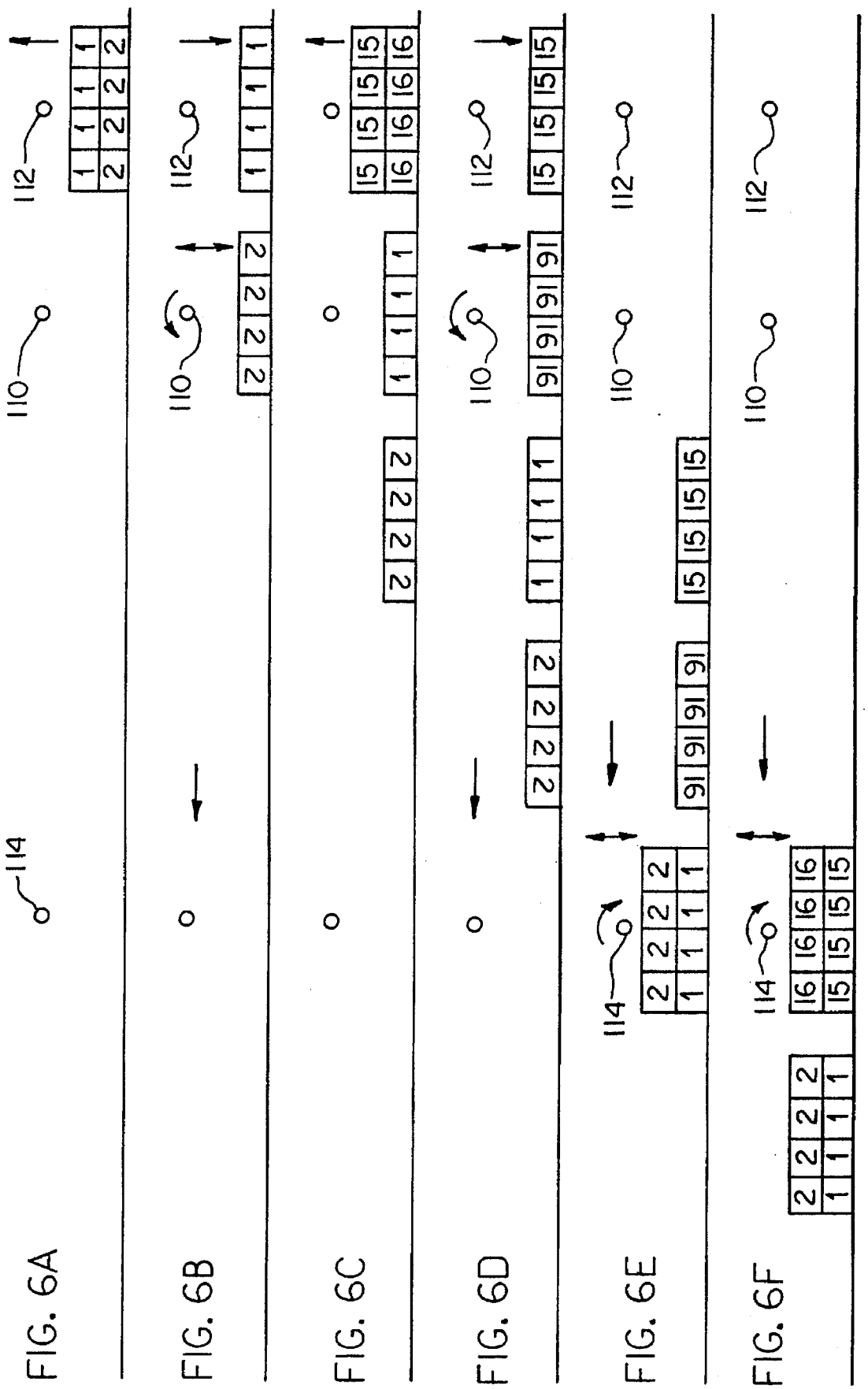

FIG. 13G

BRICK DEHACKER

BACKGROUND OF THE INVENTION

(1) Field of the Invention

The present invention relates generally to the packaging of brick and, more particularly, to an apparatus for blending courses of fired brick from the top and bottom of a kiln car.

(2) Description of the Prior Art

Bricks are normally arranged in fired kiln cars in a plurality of stacks of three stacks across the width of the kiln car and three stacks along the length thereof. The number of stacks may vary depending upon the size of the kiln car. Each stack includes a plurality of double-layer courses of brick with each successive course having the headers facing perpendicular to the headers of the previous course. Each layer of each course contains a plurality of rows and columns with 4 columns and 11 brick per column being the most common. The bricks in each column are arranged end-to-end and the bricks in the rows are spaced apart from side-to-side to allow hot gases from the kiln to more uniformly penetrate the stack of bricks.

The stacks on the kiln car generally do not correspond to the final strapped package as far as the number of brick in each row is concerned or the number of rows in each stack. Therefore, the courses of brick cannot be removed directly from the kiln car and stacked directly atop each other to form the final package because the number of bricks in each column or row on the kiln car is not generally the same as the number of bricks in each column or row on a finished package. For the most part, this is immaterial as the stacker receives columns of bricks having a fixed number of rows per column from the kiln car and forms the brick into one continuous group, which is subsequently cut off to the desired number of columns in the final package. However, the grouping of the brick courses unloaded from the kiln car into courses having a different number of rows for the final package does present problems.

One solution to this problem includes a breaking-down of courses from the kiln car into single high columns of multiple rows on an off-bearing conveyor, moving the bricks in a single file along the conveyor and regrouping by some mechanism at the end of the conveyor in the proper number of rows. The rows are then reformed into the desired number of courses and stacked in the final package.

Another solution to the problem is shown in U.S. Pat. No. 3,776,398, issued to Stewart et al., wherein a special pick-up head unloads the bricks from the kiln car and transfers them to the conveyor to rearrange bricks in mid-air by shifting the pick-up gripper elements.

Finally, U.S. Pat. No. 3,964,597, issued to Brown et al., discloses an apparatus in which brick courses are successively lifted and transferred from a kiln car onto the receiving end of a marshalling table with the longitudinal dimension of the bricks extending transversely to the table. A push mechanism pushes against the cut surface of the bricks and moves the bricks longitudinally on the table toward the discharge end thereof and urges the bricks against an upstanding wall of a moveable marshalling carriage. The carriage slides from a first position beneath the discharge end of the marshalling table to a second position beyond the discharge end in response to the pressure entered by the push mechanism. When a prescribed number of brick have been pushed against the upstanding wall and the moveable carriage moved to a second position, the push mechanism is deactivated and a clamp engages and holds the brick remaining on the marshalling table. The marshalling carriage is then moved an additional distance to space the bricks thereon from the bricks remaining on the marshalling table. A transfer push-off then moves the bricks from the carriage transversely from the receiving end of a conveying apparatus from where the bricks are moved to the stacking and strapping apparatus.

The above methods are satisfactory for most dehacking operations but in some firing situations it is desirable to be able to blend the upper and lower courses of brick with each other and with the rest of the brick in the stack prior to stacking and strapping. For example, when the brick are "flashed" to produce a darker surface, there may be considerable variability between the upper courses of brick on the kiln car and the lower courses.

Thus, there remains a need for new and improved dehacking apparatus which is operable to blend the upper and lower courses of brick with each other and, at the same time, blend these brick with the rest of the brick in the stack prior to stacking and strapping. Such an apparatus permits a greater flexibility in kiln operation while still providing a standard size package of brick for strapping.

SUMMARY OF THE INVENTION

The present invention is directed to a brick dehacking apparatus which is operable to blend the upper and lower courses of brick from a kiln car with each other and further blend these brick with brick from the middle courses of the stack in preparation for stacking and strapping.

The apparatus includes a first conveyor having a receiving end and a discharge end for moving selected upper and lower courses of brick removed from the kiln cars and deposited on the receiving end towards the discharge end of the first conveyor. A second conveyor located parallel to the first conveyor having a receiving end and a discharge end also moves selected middle courses of brick removed from the kiln cars and deposited on the receiving end towards the discharge end of the second conveyor.

A blending assembly is located transversely to the first and second conveyors for receiving selected courses of brick from the first and second conveyors and combining the courses of brick. The blending assembly includes: a blending table for receiving at least two single or double high groups of brick from the kiln car parallel to one another; a blending conveyor located transversely to the blending table for receiving at least one row of brick from each of the individual groups and blending the individual rows of brick with one another; and a marshalling table located downstream and transversely to the blending conveyor for receiving brick from the blending conveyor and at least one individual course of brick from the second conveyor car and blending the brick from the blending conveyor and the second conveyor with one another.

Another conveyor is located adjacent to the discharge end of the marshalling table to receive the courses of brick from the blending and marshalling assembly and to convey the courses of brick to a stacking and strapping station.

Accordingly, one aspect of the present invention is to provide an apparatus for selectively blending brick courses removed from a kiln car in preparation for stacking and strapping. The apparatus includes: (a) a first grouping means having a receiving end and a discharge end and means for moving selected courses of brick removed from the kiln cars and deposited on the receiving end towards the discharge end; (b) a second grouping means located parallel to the first grouping means having a receiving end and a discharge end and means for moving selected courses of brick removed from the kiln cars and deposited on the receiving end towards the discharge end; (c) blending means located transversely to the first and second grouping means for receiving selected courses of brick from the first and second grouping means and combining the courses of brick; and (d) conveying means located adjacent to the discharge end of the blending means for receiving the courses of brick from the blending means and conveying the courses of brick to a stacking and strapping station.

Another aspect of the present invention is to provide a blending apparatus for selectively blending brick courses removed from a kiln car in preparation for stacking and strapping. The blending apparatus includes: (a) a blending table for receiving at least single or double high groups of brick from the kiln car parallel to one another; (b) a blending conveyor located transversely to the blending table for receiving at least one row of brick from each of the individual groups and blending the individual rows of brick with one another, and (c) a marshalling table located downstream and transversely to the blending conveyor for receiving brick from the blending conveyor and at least one individual course of brick from a second conveyor and blending the brick from the blending conveyor and the second conveyor with one another.

Still another aspect of the present invention is to provide an apparatus for selectively blending brick courses removed from a kiln car in preparation for stacking and strapping. The apparatus includes: (a) a first grouping means having a receiving end and a discharge end and means for moving selected courses of brick removed from the kiln cars and deposited on the receiving end towards the discharge end; (b) a second grouping means located parallel to the first grouping means having a receiving end and a discharge end and means for moving selected courses of brick removed from the kiln cars and deposited on the receiving end towards the discharge end; (c) blending means located transversely to the first and second grouping means for receiving selected courses of brick from the first and second grouping means and combining the courses of brick, the blending means including: (i) a blending table for receiving at least two single or double high groups of brick from the kiln car parallel to one another; (ii) a blending conveyor located transversely to the blending table for receiving at least one row of brick from each of the individual groups and blending the individual rows of brick with one another; and (iii) a marshalling table located downstream and transversely to the blending conveyor for receiving brick from the blending conveyor and at least one individual course of brick from the second conveyor and blending the brick from the blending conveyor and the second conveyor with one another; and (d) conveying means located adjacent to the discharge end of the blending means and marshalling table for receiving the courses of brick from the blending means and marshalling table and conveying the courses of brick to a stacking and strapping station.

These and other aspects of the present invention will become apparent to those skilled in the art after a reading of the following description of the preferred embodiment when considered with the drawings.

BRIEF DESCRIPTION OF THE DRAWINGS

FIGS. 5A–5F illustrate the sequence of movement of a single course of brick along the grouping and inspection conveyor shown in FIG. 2;

FIGS. 6A–6F illustrate the sequence movement of a double course of brick along the grouping and inspection conveyor shown in FIG. 2;

DESCRIPTION OF THE PREFERRED EMBODIMENTS

Figure 1:
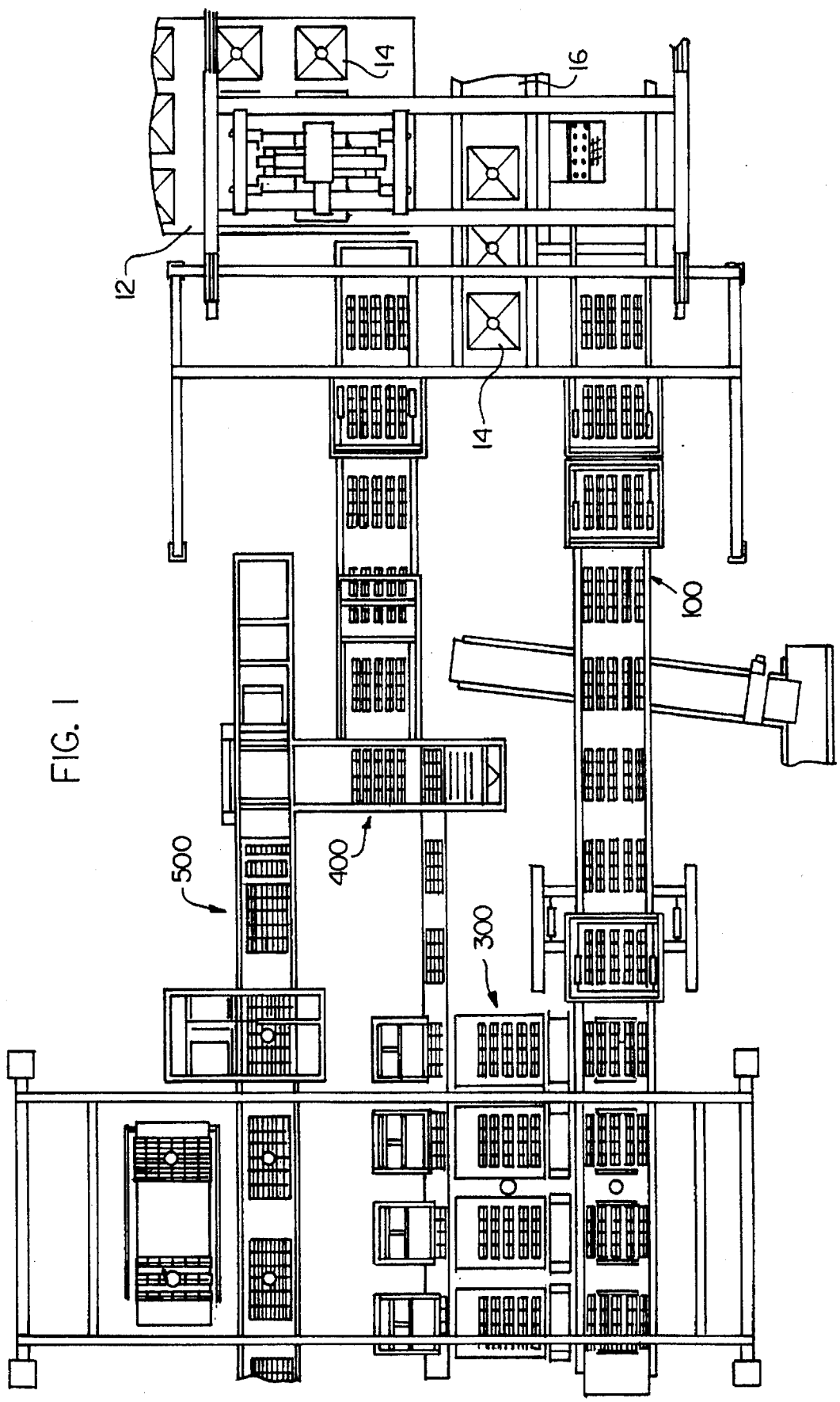
FIG. 1 is a plan view of a brick dehacker constructed according to the present invention.

In the following description, like reference characters designate like or corresponding parts throughout the several views. Also in the following description, it is to be understood that such terms as "forward", "rearward", "left", "right", "upwardly", "downwardly", and the like are words of convenience and are not to be construed as limiting terms.

Referring now to the drawings in general and FIG. 1 in particular, it will be understood that the illustrations are for the purpose of describing a preferred embodiment of the invention and are not intended to limit the invention thereto. As best seen in FIG. 1, a brick dehacker, generally designated 10, is shown constructed according to the present invention. The dehacker includes three major subassemblies: a pair of parallel grouping conveyors 100, 200; a blending table 300; and marshalling table 400. In the preferred embodiment, grouping conveyor 100 also functions as an inspection conveyor.

In operation, kiln cars 12 are moved in position adjacent to ends of grouping conveyors 100, 200. Individual stacks of brick 14 are unloaded from the individual kiln cars and sequentially placed on bung conveyor 16 prior to separation of the courses of brick onto grouping conveyors 100, 200. In the preferred embodiment, each stack of brick includes 8 alternating, double layers of brick for a total of 16 courses of brick. An unloader positioned adjacent to the discharge end of bung conveyor 16 adjacent to the receiving ends of grouping conveyors 100, 200 unloads courses 15 and 16 onto first conveyor 100; courses 3–14 onto second conveyor 200 and courses 1 and 2 onto first conveyor 100.

Due to the firing conditions in the kiln, courses 1, 2, 15 and 16 are most likely to be lighter or darker than courses 3–14. Accordingly, the present invention separates courses 1, 2, 15 and 16 from the main body of brick and blends these both together and with the main group of brick. The result of this blending operation insures that the brick from courses 1, 2, 15 and 16 will be equally distributed among the layer of the final package of brick.

Figure 2:
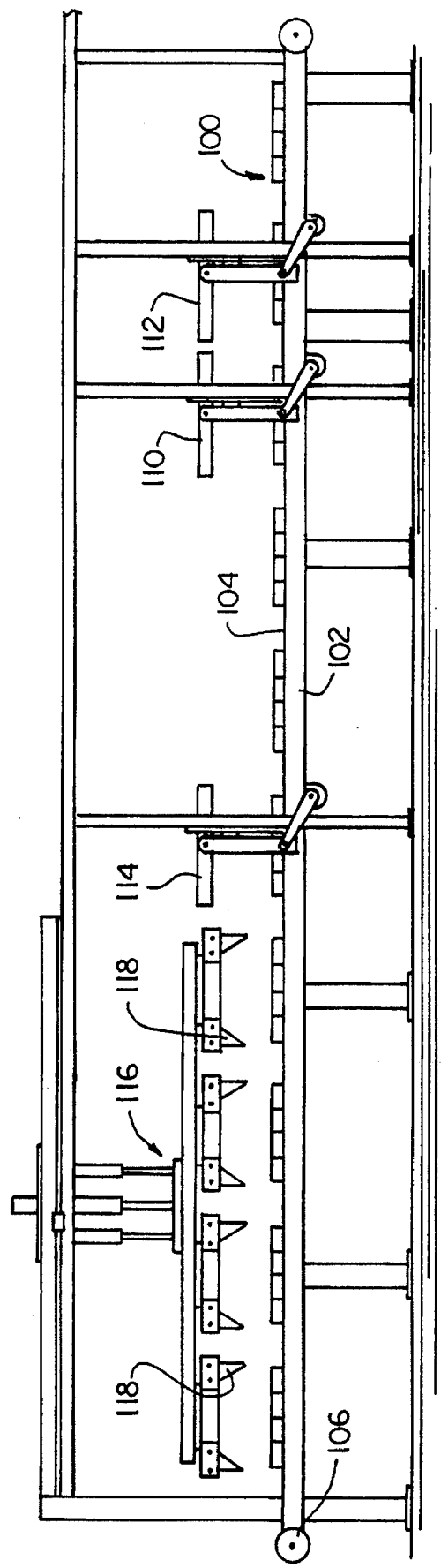
FIG. 2 is a side view of the grouping and inspection conveyor assembly.

Turning now to FIG. 2, there is shown a side view of grouping and inspection conveyor 100. Grouping and inspection conveyor 100 includes a support frame 102 for supporting a flexible belt 104. Belt 104 is driven by an electric motor 106 having a variable frequency control for controlling the speed of the motor. A plurality of turnover assemblies, 110, 112 and 114 are located along the length of grouping and inspection conveyor 100.

These inspection-stations permit the bottom of courses 1, 2, 15 and 16 to be inspected and discarded as necessary. Their function will best be understood by referring to FIGS. 5 and 6 as will be explained later. A pick-up assembly 116 having a plurality of grippers 118 is located at the discharge end of grouping and inspection conveyor 100 for off-loading courses of brick onto blending table 300.

Grouping conveyor 200 is essentially identical to grouping and inspection conveyor 100 and differs only in its staggered length to permit the kiln car to be accessed and the pusher assembly located at its discharge end. The pusher assembly moves selected courses of brick from the conveying belt onto the blending means. In the preferred embodiment, the pusher assembly includes: a track guide attached to the frame parallel to the surface of the belt; a plate and lift assembly slidably mounted in the track guide; and a motor for moving the plate and lift assembly at the same speed as the conveying belt. The plate and lift assembly includes: a frame slidably mounted in the track guide; a first pair of arms attached at one end to each side of the frame; a plate attached to the other end of the first pair of arms and transversely extending across the belt; and an actuator for raising and lowering the plate with respect to the upper surface of the belt.

Figure 3:
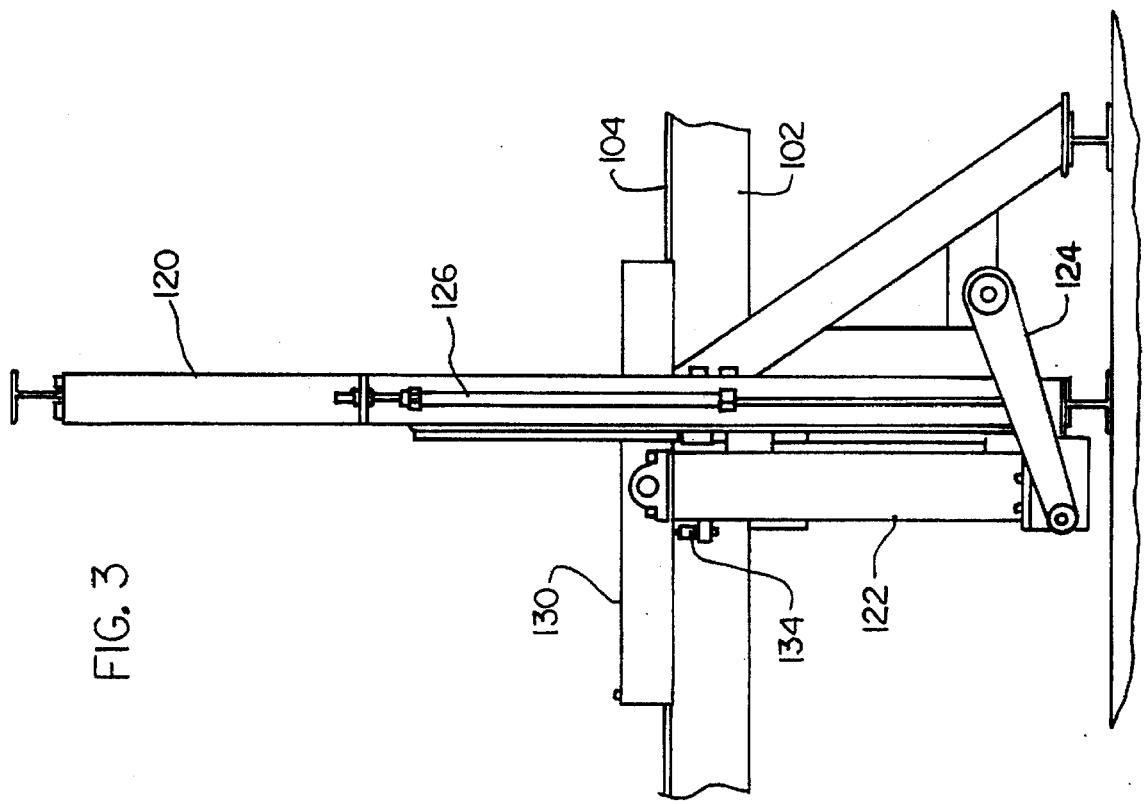
FIG. 3 is an enlarged side view of the turn-over assembly shown in FIG. 2.

Turning now to FIG. 3, there is shown an enlarged view of one of the turnover assemblies shown in FIG. 2. The turnover assemblies, 110, 112, 114 are essentially identical and differ only on their relative position on grouping and inspection conveyor 100 and their position with respect to each other as seen in FIGS. 5 and 6.

Turnover assembly 110, for example, includes a pair of vertical frames 120 attached to support frame 102 and located transversely to belt 106. A pair of carriage frames 122 are slidably mounted to each of the pair of vertical frames 120. A lever arm 124 is attached at one end to the lower end of one of the pair of vertical frames 120 and the other end to the lower end of the pair of carriage frames 122. An actuator is attached at one end to the lever arm and at the other end to the pair of vertical frames attached to support frame 102. A box-type gripper 130 is mounted to the other end of carriage frames 122. The gripper is rotated by a motor 132 attached between the gripper box 130 and the end of carriage frame 122. A mechanical stop 134 attached to gripper frame 122 allows the gripper box 130 to rotate 180° in either direction.

Figure 4:
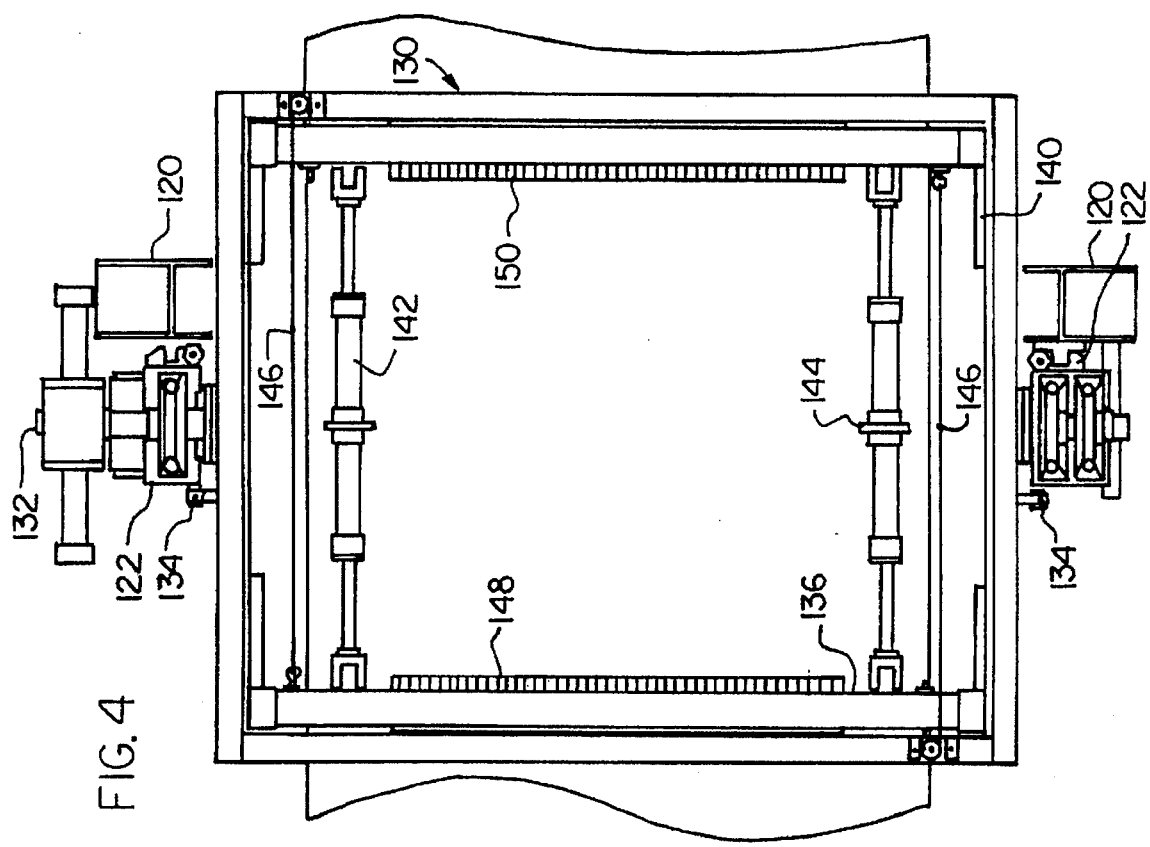
FIG. 4 is an enlarged plan view of the turn-over assembly shown in FIG. 2.

Turning now to FIG. 4, there is shown an enlarged top view of the turnover assembly shown in FIG. 2. Turnover assembly 130 includes a pair of opposed gripper bars 136, 138. Opposed gripper bars 136, 138 are slidably mounted in guides 140 located on the inside of gripper box 130. A pair of actuator dual pistons 142, 144 are attached at each end to opposite ends of opposed gripper bars 136, 138. Cable pulley assemblies 146 attached to each end of the gripper bars 136, 138 ensures that the bars move in equally rather than being off center. Rubber gripper strips 148, 150 located on the inner surface of opposed gripper bars 136, 138 to contact the outer periphery of each course of brick on belt 104.

The operation of the grouping and inspection conveyor 100 can best be understood by a review of FIGS. 5A–5F which illustrate the sequence of movement of single courses of brick along the grouping and inspection conveyor shown in FIG. 2. As can be seen, the first two courses of brick, courses 1 and 2, are unloaded from the stack 14 on bung conveyor 16 onto grouping and inspection conveyor 100. Turnover assembly 112 then picks up layer 1 from courses 1 and 2 (5A). Belt 104 is indexed forward and turnover assembly, operated in the non-turnover mode, places course 1 back onto the surface of belt 104 upstream of course 2. Turnover assembly 110 picks up and turns over course 2 and places it back on belt 104 for inspection (5B). The belt is then indexed forward, the remainder of stack 14, courses 3–14, are unloaded onto conveyor 200, and layers 15 and 16 are placed onto the surface of belt 104. Turnover assembly 112 then lifts course 15 and the belt is indexed forward (5C). Turnover assembly 110 then picks up course 16 and rotates it 180° and places it back on the surface of belt 104. At the same time, turnover assembly 112 places course 15 back on the surface of belt 104 (5D).

The belt 104 is indexed until layer 2 is aligned with turnover assembly 114. Turnover assembly 114 then lifts and rotates layer 2 and places it back on the surface of belt 104 (5E). Belt 104 is then indexed forward and course 16 is lifted, rotated 180° and set down back onto belt 104. Courses 2, 1, 16 and 15 are then ready to be received by blending table 300.

In an alternative embodiment as shown in FIG. 6A–6F, double courses rather than single courses of brick are fed onto blending table 300. As can be seen, the first steps are identical to FIGS. 5A–5D. The first two courses of brick, courses 1 and 2, are unloaded from the stack 14 on bung conveyor 16 onto grouping and inspection conveyor 100. Turnover assembly 112 then picks up layer 1 from courses 1 and 2 (6A). Belt 104 is indexed forward and turnover assembly, operated in the non-turnover mode, places course 1 back onto the surface of belt 104 upstream of course 2. Turnover assembly 110 picks up and turns over course 2 and places it back on belt 104 for inspection (6B). The belt is then indexed forward, the remainder of stack 14, courses 3–14, are unloaded onto conveyor 200, and layers 15 and 16 are placed onto the surface of belt 104. Turnover assembly 112 then lifts course 15 and the belt is indexed forward (6C). Turnover assembly 110 then picks up course 16 and rotates it 180° and places it back on the surface of belt 104. At the same time, turnover assembly 112 places course 15 back on the surface of belt 104 (6D).

Belt 104 is indexed forward and turnover 114 picks up inverted group 2 and lifts and rotates this course of brick. The belt is then indexed forward again and turnover 114 places layer 2 onto layer 1 (6E). The belt is then indexed forward again, and this operation is repeated for layers 16 and 15 (6F). This operation produces two double-layer courses for blending.

Figure 7:
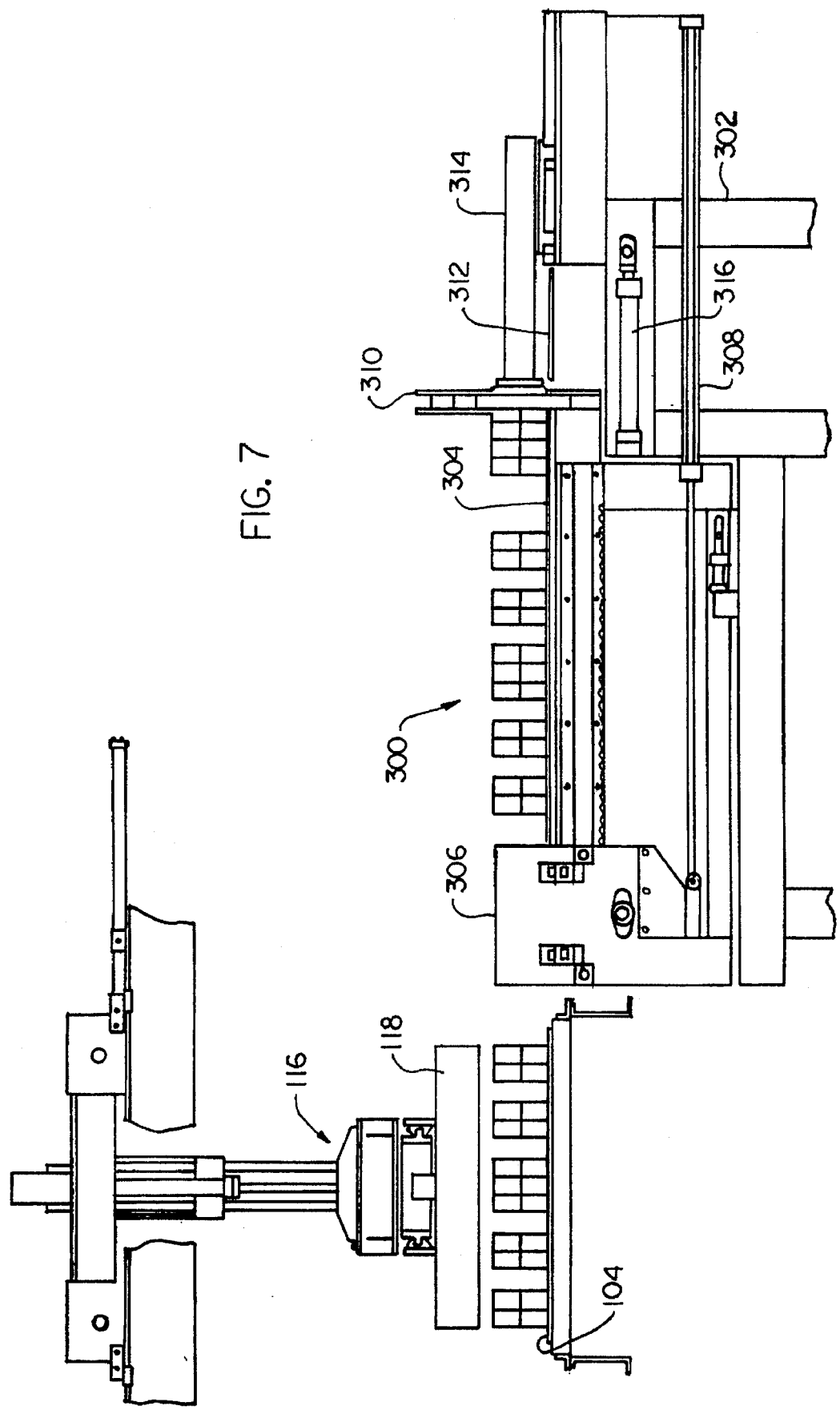
FIG. 7 is a side view of the blending table.

Turning now to FIG. 7 there is shown a side view of the blending table 300. Blending table 300 is transversely mounted with respect to belt 104 of grouping and inspection conveyor 100 and pick-up head 116. In the preferred embodiment, blending table 300 includes provisions for handling four groups of brick simultaneously. The sequence of movement of the brick through blending table 300 can best be understood by referring to FIG. 8 and 9 which will be discussed later.

Blending table 300 includes a support frame 302 for supporting a slide plate 304. A pusher carriage 306 is located at the end of slide plate 304 adjacent to belt 104. An actuator 308 is connected between the pusher carriage 306 and support frame 302 for moving a single or double course of brick along the surface of slide plate 304 towards brick clamp 310. A blend conveyor 312 is transversely mounted to blending table 300 and generally parallel to grouping and inspection conveyor 100. A measuring carriage 314 adjacent to blend conveyor 312 is indexed by actuator 316 to measure one to four rows of bricks onto blend conveyor 312.

Figure 8:
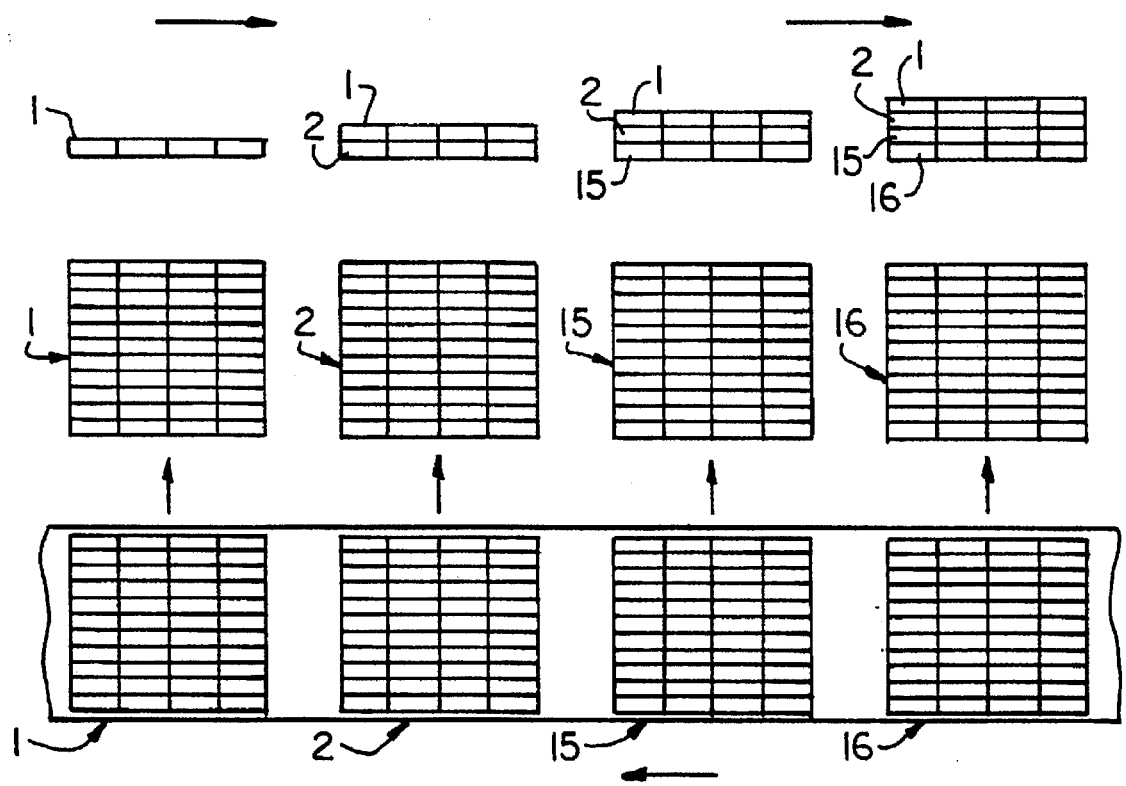
FIG. 8 is a top view of the sequence of movement of a single course of brick through the blending table.

The sequence of movement of a single course of brick through blending table 300 may best be understood by referring to FIG. 8. As can be seen, courses of brick are moved down along grouping and inspection conveyor 100 until they are aligned with pick-up head 116. Pick-up head 116 lifts up and deposits courses of brick 1, 2, 15 and 16 onto corresponding slide plates 304. Pusher carriages 306 sequentially move one row of brick at a time off of slide plates 304 forming 4×11 rows of brick having brick from course 1, then courses 1 and 2, then courses 1, 2 and 15, and finally courses 1, 2, 15 and 16 as blend conveyor 312 is indexed forward towards marshalling table 400. This sequence of operation mixes brick from upper courses 1 and 2 with lower courses 15 and 16, thereby reducing the variability between the upper and lower courses of stack 14.

Figure 9:
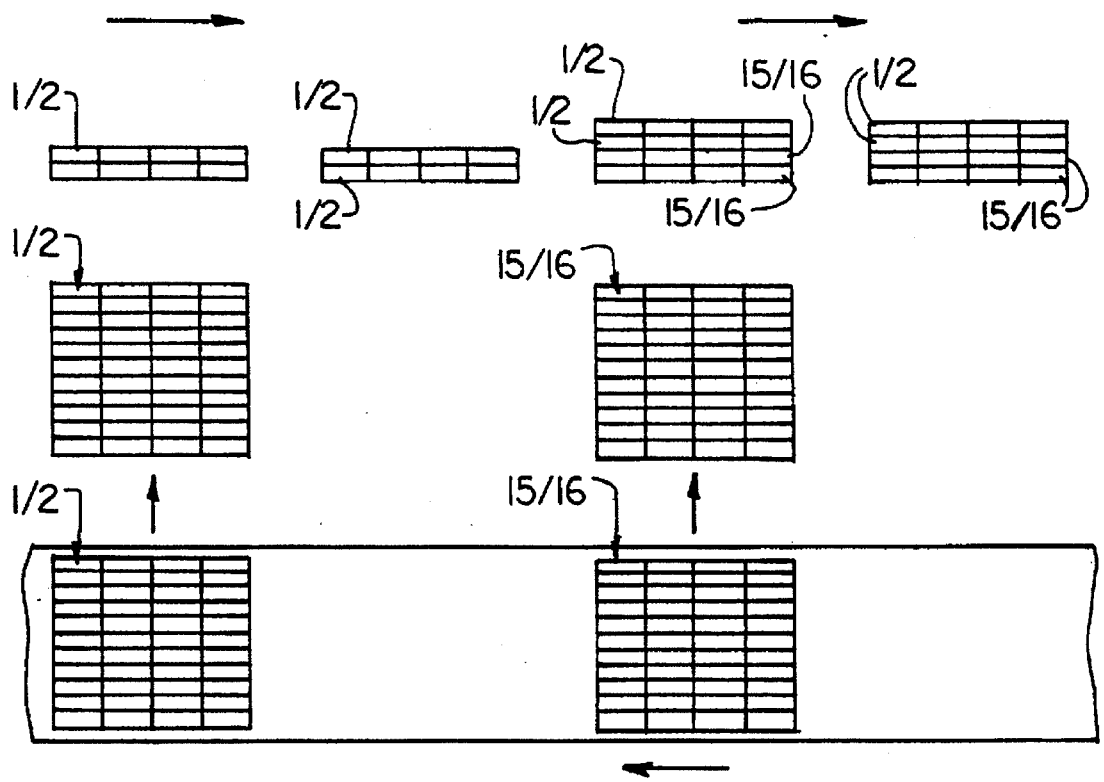
FIG. 9 is a top view of the sequence of movement of a double course of brick through the blending table.

Turning now to FIG. 9, there is shown a top view of the sequence of movement of double courses of brick through the blending table 300. The primary difference is that courses 1 and 2 and 15 and 16 are stacked onto one another and only two of the slide plates 304 are utilized. In the preferred embodiment, this sequence of movement is utilized during the inspection and restacking of courses of brick shown in FIGS. 6A–6F.

Figure 10:
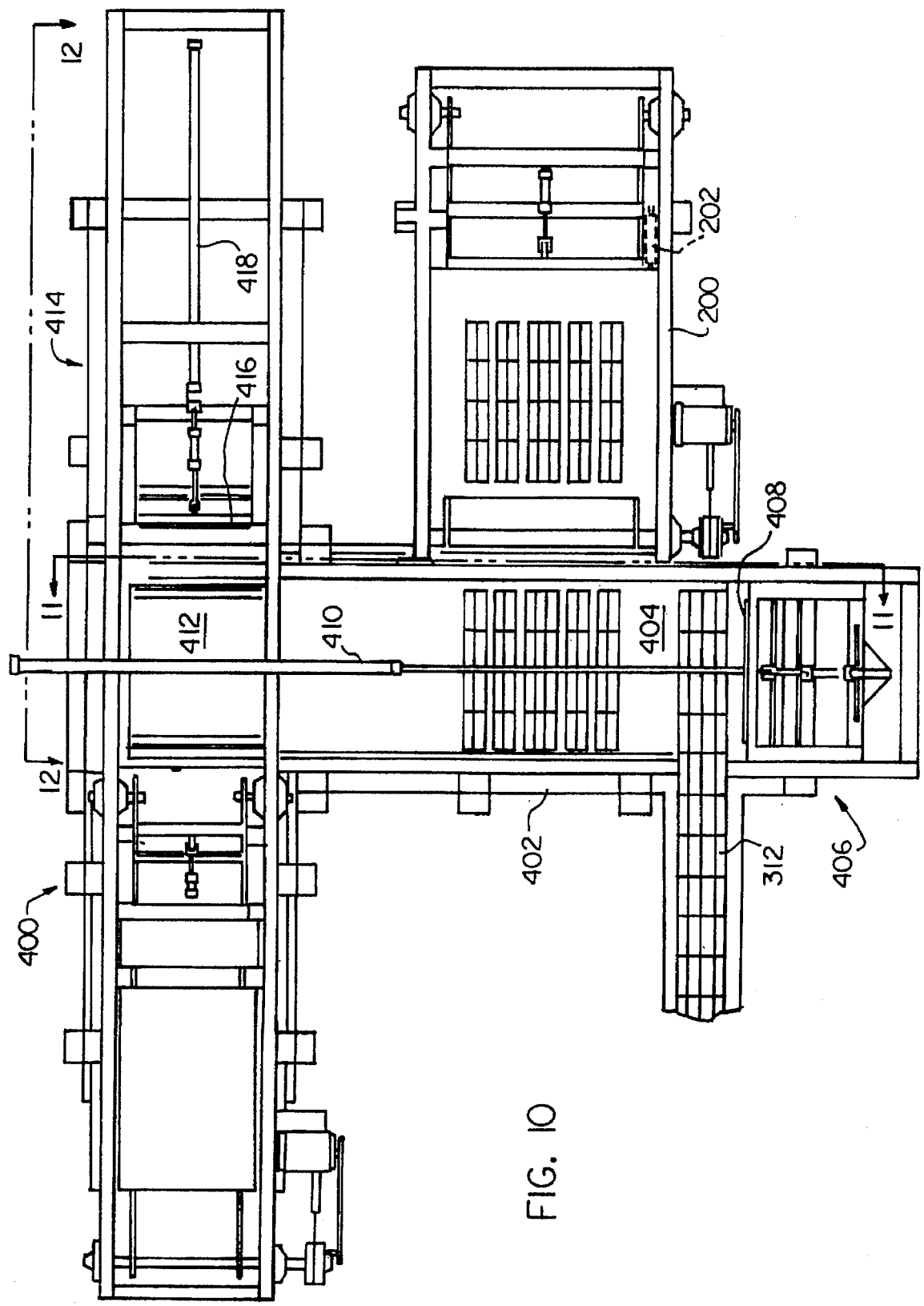
FIG. 10 is a plan view of the marshalling table.

FIG. 10 is a plan view of the marshalling table assembly 400 which receives the brick from blending table 300 along blend conveyor 312. Marshalling table assembly 400 includes a support frame 402 for supporting a marshalling table 404 mounted transversely to blend conveyor 312 and grouping conveyor 200 for supporting marshalling table 404. A charging pusher 406 is located at the receiving end of the marshalling table 404 adjacent to blend conveyor 312. Charging pusher 406 includes a pusher plate 408 and an actuator 410 attached at one end to pusher plate 408 and at the other end to support frame 402. A loader table 412 is located at the opposite end of marshalling table 404. A discharge pusher 414 is transversely mounted with respect to marshalling table 404 adjacent to loader table 412. Discharge pusher 414 includes a pusher plate 416 and an actuator 418.

Figure 11:
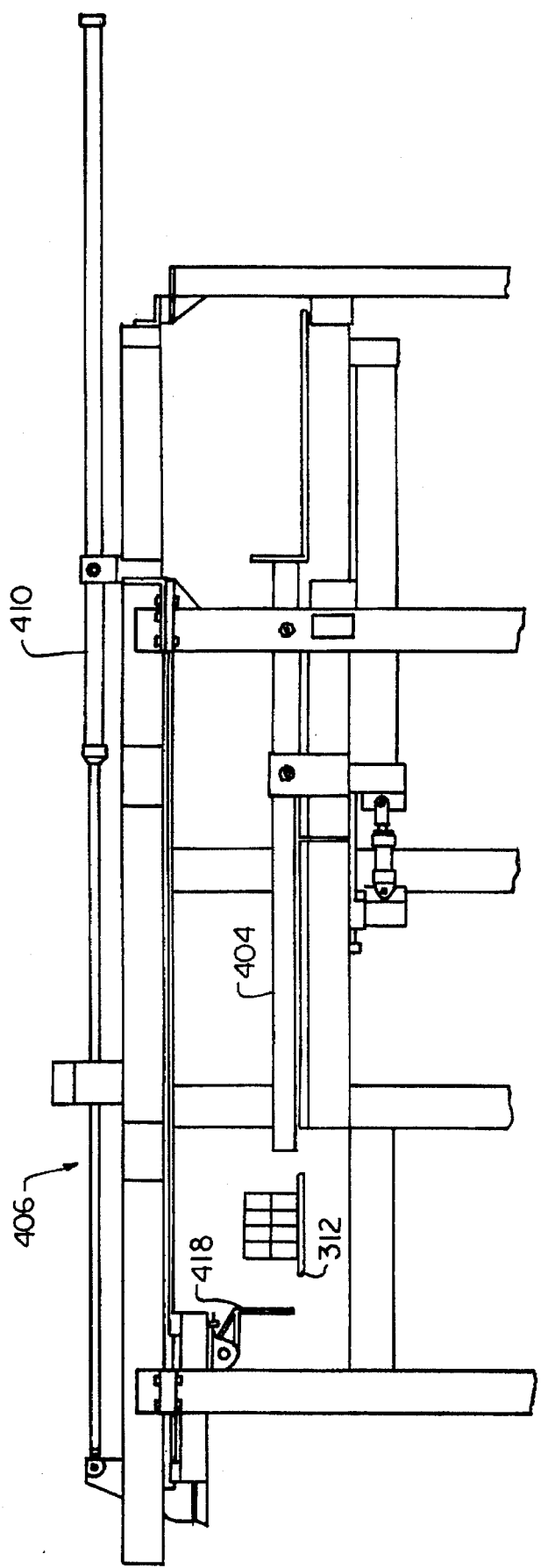
FIG. 11 is a side view of the charging pusher shown in FIG. 10, taken along line 11—11.

FIG. 11 is a side view of the charging pusher 406 shown in FIG. 10 taken along line 11—11.

Figure 12:
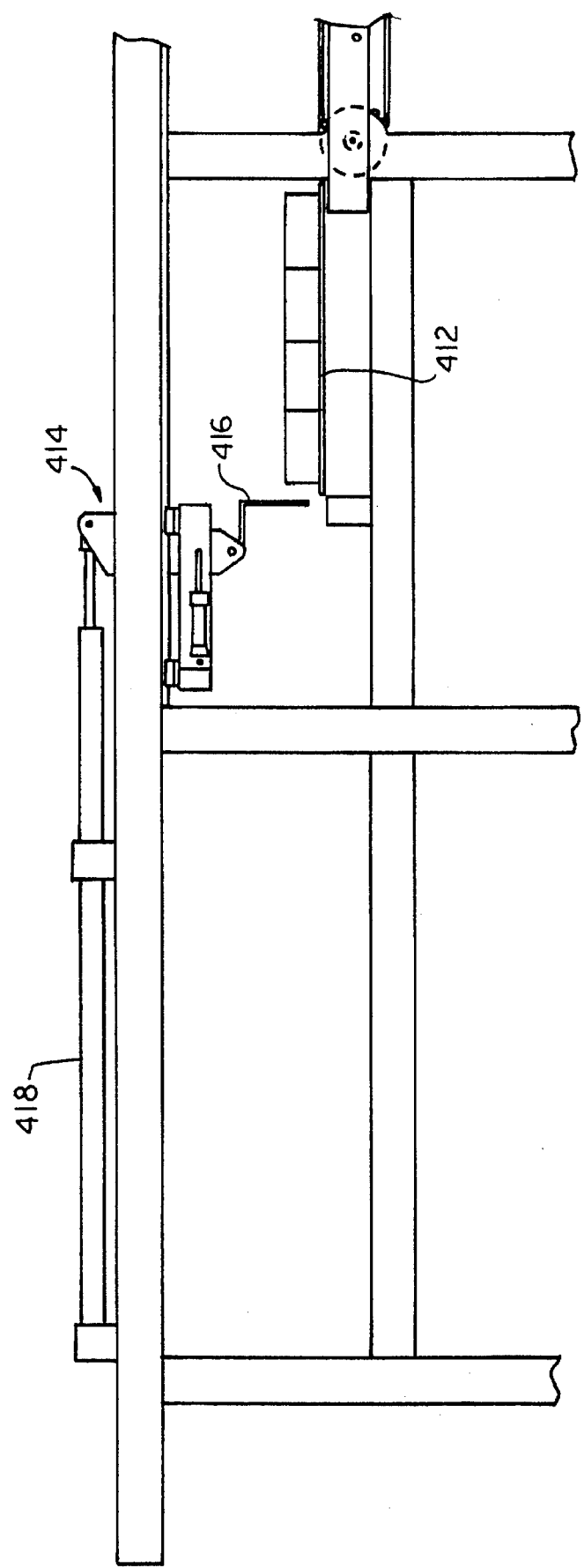
FIG. 12 is a side view of the discharge pusher shown in FIG. 10, and taken along line 12—12.

FIG. 12 is a side view of the discharge pusher 414 shown in FIG. 10, taken along line 12—12.

Figures 13A, 13B, 13C, 13D, 13E, 13F, 13G:
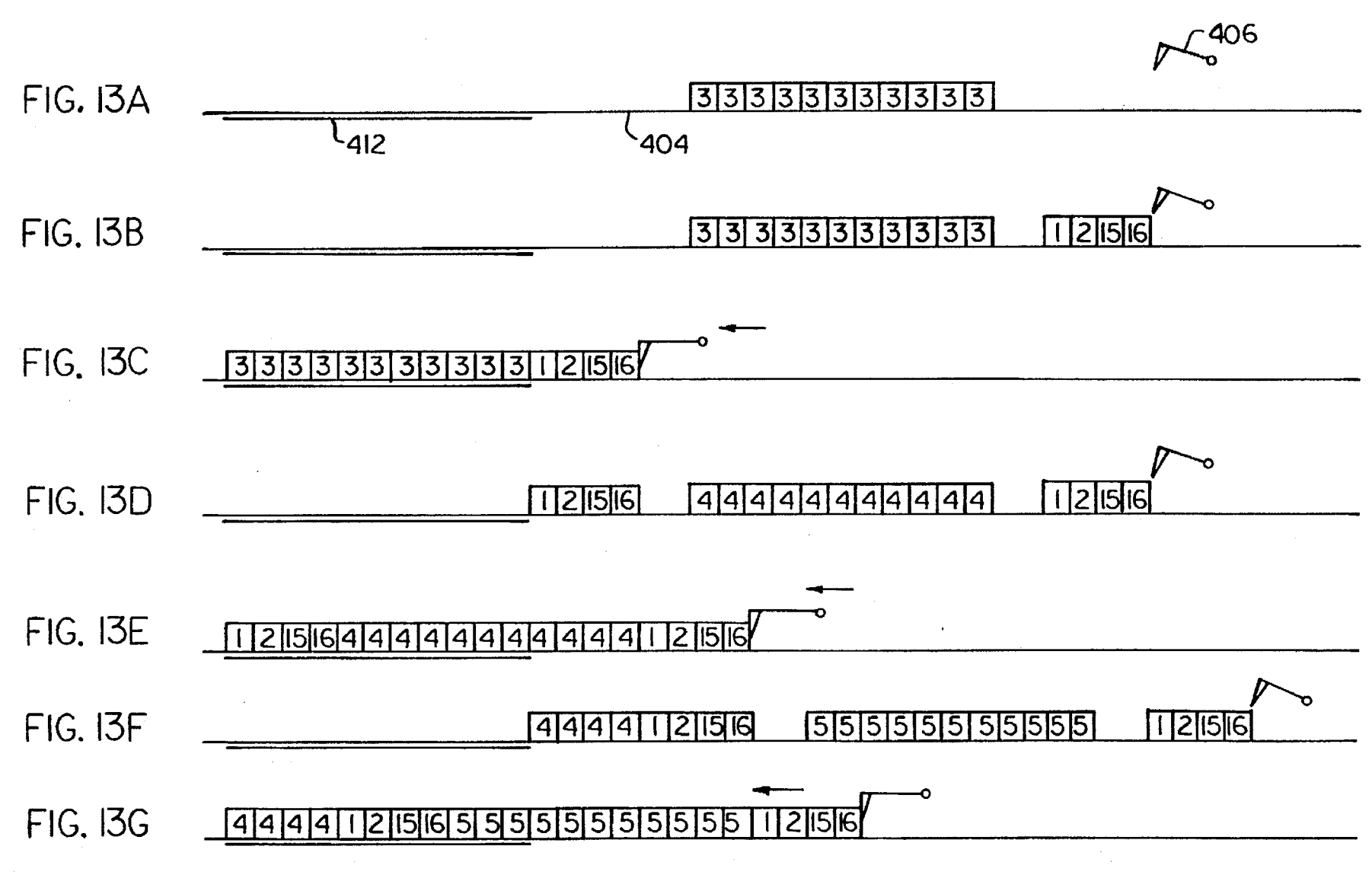

The sequence of movement of a single course of brick through marshalling table 400 can best be understood by referring to FIG. 13. In the initial start-up, course 3 of a stack of brick 14 is pushed off of grouping conveyor 200 by pusher assembly 202 onto marshalling table 404 (13A). Blend conveyor 312 is indexed forward to align a course of brick including brick from layers 1, 2, 15 and 16 (13B). Charging pusher 406 is actuated to move course 3, having 11 rows, onto loader table 412 (13C). A new course of brick, course 4, is pushed onto marshalling table 404 from grouping conveyor 200 and blend conveyor 312 is indexed forward to align another group of brick, including brick from layers 1, 2, 15 and 16 similar to step 13B (13D). Pusher 406 is actuated to load another 11 rows of brick onto loader table 412 (13E). Course 5 is then pushed onto marshalling table 404 and blend conveyor 312 is indexed forward again (13F).

Charging pusher 406 then pushes another 11 brick onto loader table 412 (13G). This sequence is continuously repeated (13H–13L) with, in the preferred embodiment, a total of 15 rows of brick being loaded onto the marshalling table and only 11 rows being off loaded each time.

Figures 13H, 13I, 13J, 13K, 13L, 13M:
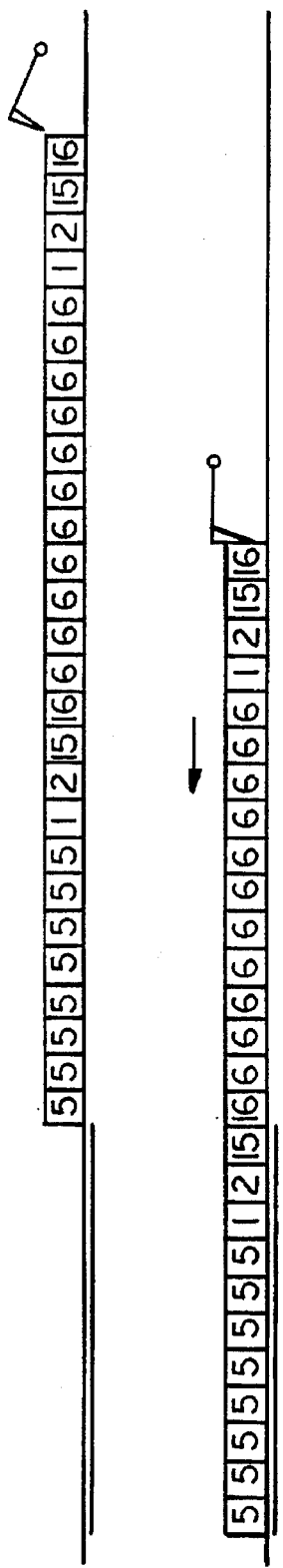
FIG. 13 illustrates the sequence of movement of a single course of brick along the marshalling table.

As can be seen by a comparison of FIG. 13M to FIG. 13H, the loading of groups of 11 rows and 4 rows of brick and the discharging of groups of 11 rows of brick result in the number of brick from a course being pushed onto loader table 412 to increment by 1. For example, in FIG. 13H there are 8 brick from course 5. But in FIG. 13M, there are 9 brick from course 9 and there will be 10 brick from course 13.

The operation continues sequentially resulting in brick from courses 1, 2, 15 and 16 being blended both with one another and with the brick from courses 3–14.

Certain modifications and improvements will occur to those skilled in the art upon a reading of the foregoing description. It should be understood that all such modifications and improvements have been deleted herein for the sake of conciseness and readability but are properly within the scope of the following claims.

We claim:

1. An apparatus for selectively blending brick courses removed from a kiln car in preparation for stacking and strapping, said apparatus comprising:

(a) a first grouping means having a receiving end and a discharge end and means for moving selected courses of brick removed from said kiln cars and deposited on said receiving end towards said discharge end;

(b) a second grouping means located parallel to said first grouping means having a receiving end and a discharge end and means for moving selected courses of brick removed from said kiln cars and deposited on said receiving end towards said discharge end;

(c) blending means located transversely to said first and second grouping means for receiving selected courses of brick from said first and second grouping means and combining said courses of brick; and (d) conveying means located adjacent to the discharge end of said blending means for receiving said courses of brick from said blending means and conveying said courses of brick to a stacking and strapping station.

2. The apparatus according to claim 1, wherein said first grouping means having a receiving end and a discharge end and means for moving selected courses of rows of brick removed from said kiln cars and deposited on said receiving end towards said discharge end includes: a frame; a conveying belt attached to said frame; a motor for driving said belt; and a pick-up head located adjacent to the discharge end of said first grouping means and for moving said selected courses of said brick from said conveying belt onto said blending means.

3. The apparatus according to claim 2, further including a take-up means for maintaining said belt under tension.

4. The apparatus according to claim 3, wherein said take-up means is a serpentine loop and spring arrangement.

5. The apparatus according to claim 1, wherein said second grouping means having a receiving end and a discharge end and means for moving selected courses of rows of brick removed from said kiln cars and deposited on said receiving end towards said discharge end includes: a frame; a conveying belt attached to said frame; a motor for driving said belt; and a pusher assembly for moving said selected courses of brick from said conveying belt onto said blending means.

6. The apparatus according to claim 5, wherein said pusher assembly includes: a track guide attached to said frame parallel to the surface of said belt; a plate and lift assembly slidably mounted in said track guide; a motor for moving said plate and lift assembly at the same speed as said conveying belt; and a chain drive connecting said motor and said plate and lift assembly.

7. The apparatus according to claim 6, wherein said plate and lift assembly includes: a frame slidably mounted in said track guide; a first pair of arms attached at one end to each side of said frame; a plate attached to the other end of said first pair of arms and transversely extending across said belt; and an actuator for raising and lowering said plate with respect to the upper surface of said belt.

8. The apparatus according to claim 1, further including inspection means attached to said first grouping means for permitting the bottom side of said selected courses of brick to be viewed.

9. The apparatus according to claim 8, wherein said inspection means attached to said first grouping means includes a plurality of turnover assemblies for selectively lifting a selected course of brick from the upper surface of said belt, rotating said selected course of brick 180° to invert said selected course of brick, and placing said selected course of brick back on the upper surface of said belt.

10. The apparatus according to claim 9, wherein each of said plurality of turnover assemblies includes: a gripping means for gripping said selected course of brick; a lifting means for moving said selected course of brick with respect to the upper surface of said belt; and inverting means for rotating said selected course of brick 180°.

11. The apparatus according to claim 10, wherein said gripping means includes: a rectangular frame having a pair of movable gripping bars slidably mounted to opposite sides of said frame; at least one actuator connected between said gripping bars for moving said bars between a first release position and a second gripping position; and means for maintaining said gripping bars in parallel relationship to one another.

12. The apparatus according to claim 11, wherein said means for maintaining said gripping bars in parallel relationship to one another includes: a pair of pulleys attached to opposite corners of said rectangular frame and a pair of cables each attached at one end to adjacent ends of each gripping bar.

13. The apparatus according to claim 10, wherein said lifting means for moving said selected course of brick with respect to the upper surface of said belt includes: a pair of vertical support frames attached to opposite sides of said first grouping means; a carriage frame slidably mounted to each of said support frames; and actuator means attached between at least one of said support frames and said carriage frames for selectively moving said carriage frame with respect to said belt.

14. The apparatus according to claim 13, wherein said actuator means attached between at least one of said support frames and said carriage frames for selectively moving said carriage frame with respect to said belt includes a lever arm having one end attached to said carriage frame and the other end attached to said first grouping means and a fluid operated cylinder attached at one end to said vertical support frame and at the other end to said lever.

15. The apparatus according to claim 10, wherein said inverting means for rotating said selected course of brick 180° includes a fluid operated motor and a stop both attached to said gripping means and said lifting means for limiting the rotation gripping means to 180°.

16. A blending apparatus for selectively blending brick courses removed from a kiln car and loaded onto first and second conveyors in preparation for stacking and strapping, said apparatus comprising:

(a) a blending table for receiving at least two individual groups of brick from said first conveyor parallel to one another;

(b) a blending conveyor located transversely to said blending table for receiving at least one row of brick from each of said individual groups and blending said individual rows of brick with one another; and (c) a marshalling table located downstream and transversely to said blending conveyor for receiving brick from said blending conveyor and at least one individual course of brick from said second conveyor and blending said brick from said blending conveyor and said second conveyor car with one another.

17. The apparatus according to claim 16, wherein said blending table includes:

(i) a plurality of parallel tables, each table having a receiving end and a discharge end;

(ii) a pusher assembly located at the receiving end of each table; and (iii) an accumulator means located at the discharge end of said table for sequentially accumulating at least one row of brick from each of said individual courses of brick from said kiln car.

18. The apparatus according to claim 16, wherein said marshalling table includes:

(i) a table having a receiving end and a discharge end;

(ii) a first charging pusher assembly located adjacent to said receiving end of said table and transversely to said blending conveyor for transferring brick from said blending conveyor onto the receiving end of said table;

(iii) a second charging pusher assembly located adjacent to said receiving end of said table and downstream and transversely to said first charging pusher for transferring at least one individual course of brick from said kiln car; and (iv) a discharge pusher assembly located adjacent to said discharge end of said table and downstream and transversely to said second charging pusher for transferring brick blended from said blending conveyor and at least one individual course of brick from said kiln car.

19. The apparatus according to claim 18, wherein said first and second charging pusher assembly includes: a frame; a fluid operated cylinder attached at one end to said frame; and a plate attached to the other end of said cylinder.

20. The apparatus according to claim 18, wherein said discharge pusher assembly includes: a frame; a fluid operated cylinder attached at one end to said frame; and a plate attached to the other end of said cylinder.

21. An apparatus for selectively blending brick courses removed from a kiln car in preparation for stacking and strapping, said apparatus comprising:

(a) a first grouping means having a receiving end and a discharge end and means for moving selected courses of brick removed from said kiln car and deposited on said receiving end towards said discharge end;

(b) a second grouping means located parallel to said first grouping means having a receiving end and a discharge end and means for moving selected courses of brick removed from said kiln car and deposited on said receiving end towards said discharge end;

(c) blending means located transversely to said first and second grouping means for receiving selected courses of brick from said first and second grouping means and combining said courses of brick, said blending means including: (i) a blending table for receiving at least two individual groups of brick from said first grouping means parallel to one another; (ii) a blending conveyor located transversely to said blending table for receiving at least one row of brick from each of said individual groups and blending said individual rows of brick with one another; and (iii) a marshalling table located downstream and transversely said blending conveyor for receiving brick from said blending conveyor and at least one individual course of brick from said second grouping means and blending said brick from said blending conveyor and said second grouping means with one another; and (d) conveying means located adjacent to the discharge end of said marshalling table for receiving said courses of brick from said blending means and marshalling table and conveying said courses of brick to a stacking and strapping station.

22. The apparatus according to claim 21, wherein said first grouping means having a receiving end and a discharge end and means for moving selected courses of rows of brick removed from said kiln cars and deposited on said receiving end towards said discharge end includes: a frame; a conveying belt attached to said frame; a motor for driving said belt; and a pick-up head located adjacent to the discharge end of said first grouping means and for moving said selected courses of said brick from said conveying belt onto said blending means.

23. The apparatus according to claim 22, further including a take-up means for maintaining said belt under tension.

24. The apparatus according to claim 23, wherein said take-up means is a serpentine loop and spring arrangement.

25. The apparatus according to claim 21, wherein said second grouping means having a receiving end and a discharge end and means for moving selected courses of rows of brick removed from said kiln cars and deposited on said receiving end towards said discharge end includes: a frame; a conveying belt attached to said frame; a motor for driving said belt; and a pusher assembly for moving said selected courses of brick from said conveying belt onto said blending means.

26. The apparatus according to claim 25, wherein said pusher assembly includes: a track guide attached to said frame parallel to the surface of said belt; a plate and lift assembly slidably mounted in said track guide; a motor for moving said plate and lift assembly at the same speed as said conveying belt; and a chain drive connecting said motor and said plate and lift assembly.

27. The apparatus according to claim 26, wherein said plate and lift assembly includes: a frame slidably mounted in said track guide; a first pair of arms attached at one end to each side of said frame; a plate attached to the other end of said first pair of arms and transversely extending across said belt; and an actuator for raising and lowering said plate with respect to the upper surface of said belt.

28. The apparatus according to claim 21, further including inspection means attached to said first grouping means for permitting the bottom side of said selected courses of brick to be viewed.

29. The apparatus according to claim 28, wherein said inspection means attached to said first grouping means includes a plurality of turnover assemblies for selectively lifting a selected course of brick from the upper surface of said belt, rotating said selected course of brick 180° to invert said selected course of brick, and placing said selected course of brick back on the upper surface of said belt.

30. The apparatus according to claim 29, wherein each of said plurality of turnover assemblies includes: a gripping means for gripping said selected course of brick; a lifting means for moving said selected course of brick with respect to the upper surface of said belt; and inverting means for rotating said selected course of brick 180°.

31. The apparatus according to claim 30, wherein said gripping means include%: a rectangular frame having a pair of movable gripping bars slidably mounted to opposite sides of said frame; at least one actuator connected between said gripping bars for moving said bars between a first release position and a second gripping position; and means for maintaining said gripping bars in parallel relationship to one another.

32. The apparatus according to claim 31, wherein said means for maintaining said gripping bars in parallel relationship to one another includes: a pair of pulleys attached to opposite corners of said rectangular frame and a pair of cables each attached at one end to adjacent ends of each gripping bar.

33. The apparatus according to claim 30, wherein said lifting means for moving said selected course of brick with respect to the upper surface of said belt includes: a pair of vertical support frames attached to opposite sides of said first grouping means; a carriage frame slidably mounted to each of said support frames; and actuator means attached between at least one of said support frames and said carriage frames for selectively moving said carriage frame with respect to said belt.

34. The apparatus according to claim 33, wherein said actuator means attached between at least one of said support frames and said carriage frames for selectively moving said carriage frame with respect to said belt includes a lever arm having one end attached to said carriage frame and the other end attached to said first grouping means and a fluid operated cylinder attached at one end to said vertical support frame and at the other end to said lever.

35. The apparatus according to claim 30, wherein said inverting means for rotating said selected course of brick 180° includes a fluid operated motor and a stop both attached to said gripping means and said lifting means for limiting the rotation gripping means to 180°.

36. The apparatus according to claim 21, wherein said blending table includes:
 (i) a plurality of parallel tables, each table having a receiving end and a discharge end;
 (ii) a pusher assembly located at the receiving end of each table; and
 (iii) an accumulator means located at the discharge end of said table for sequentially accumulating at least one row of brick from each of said individual courses of brick from said kiln car.

37. The apparatus according to claim 21, wherein said marshalling table includes:
 (i) a table having a receiving end and a discharge end;
 (ii) a first charging pusher assembly located adjacent to said receiving end of said table and transversely to said blending conveyor for transferring brick from said blending conveyor onto the receiving end of said table;

(iii) a second charging pusher assembly located adjacent to said receiving end of said table and downstream and transversely to said first charging pusher for transferring at least one individual course of brick from said kiln car; and (iv) a discharge pusher assembly located adjacent to said discharge end of said table and downstream and transversely to said second charging pusher for transferring brick blended from said blending conveyor and at least one individual course of brick from said kiln car.

38. The apparatus according to claim 37, wherein said first and second charging pusher assembly includes: a frame; a fluid operated cylinder attached at one end to said frame; and a plate attached to the other end of said cylinder.

39. The apparatus according to claim 37, wherein said discharge pusher assembly includes: a frame; a fluid operated cylinder attached at one end to said frame; and a plate attached to the other end of said cylinder.

* * * * *